July 21, 1925.
W. R. GREEN
1,546,651
BRACE FOR MUD GUARDS
Filed Nov. 15, 1924
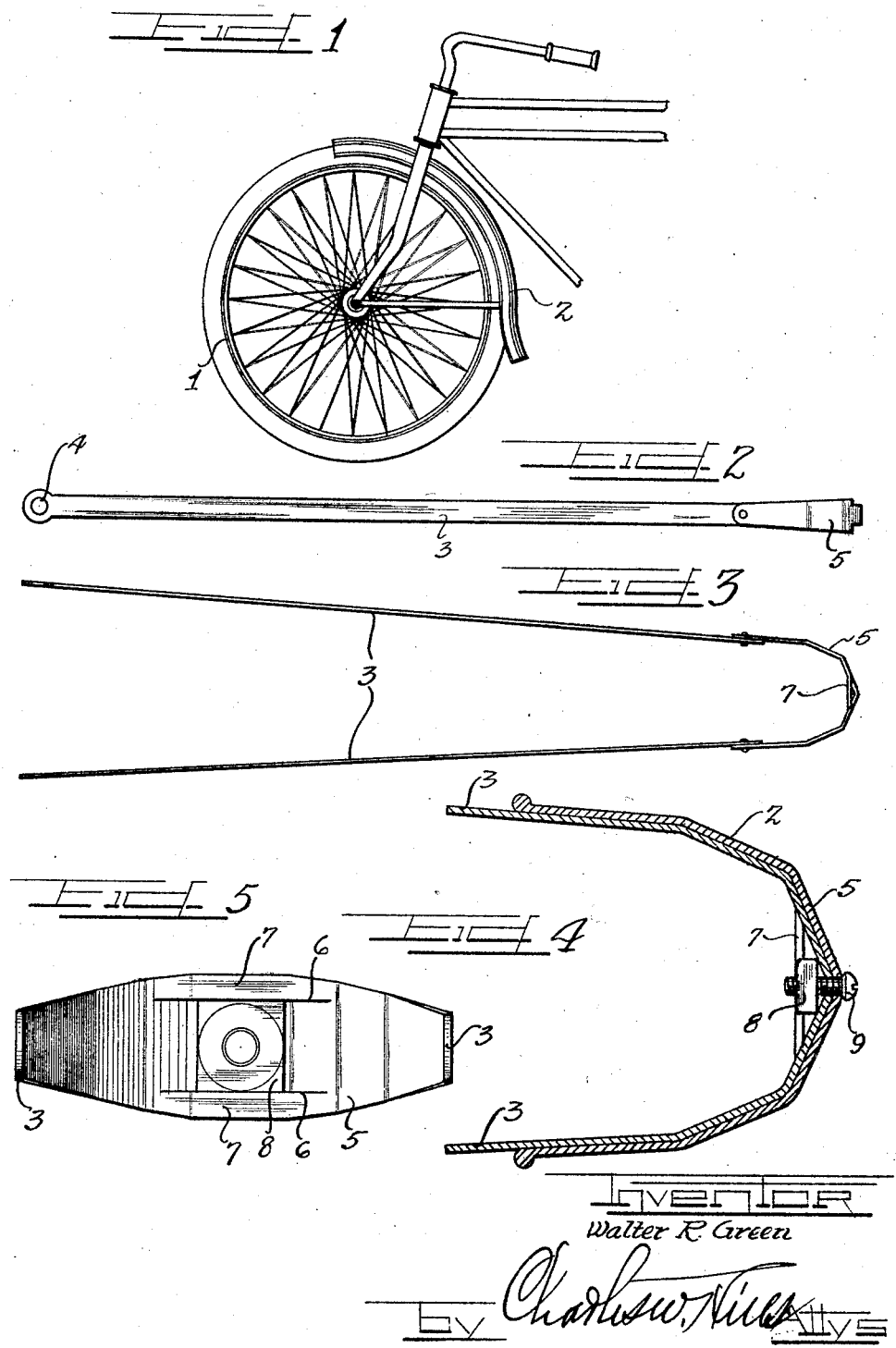
Inventor
Walter R Green Patented July 21, 1925.

1,546,651

UNITED STATES PATENT OFFICE.

WALTER R. GREEN, OF CHICAGO, ILLINOIS.

BRACE FOR MUD GUARDS.

Application filed November 15, 1924. Serial No. 750,055.

*To all whom it may concern:*

Be it known that I, WALTER R. GREEN, a citizen of the United States, and a resident of the city of Chicago, in the county of Cook and State of Illinois, have invented certain new and useful Improvements in a Brace for Mud Guards; and I hereby declare that the following is a full, clear, and exact description of the same, reference being had to the accompanying drawings, and to the numerals of reference marked thereon, which form a part of this specification.

This invention relates to a brace for mud guards and concerns itself primarily with a structure that will be strong and durable and that will facilitate the application thereof to a mud guard on a cycle.

The invention comprises the novel structure and combinations hereinafter described and more particularly pointed out and defined in the appended claims.

In the accompanying drawings which illustrate a preferred embodiment of this invention and in which similar reference numerals refer to similar features in the different views:

Figure 1 is a fragmentary side elevational view of a cycle showing the front wheel with a mud guard supported by my novel brace.

Figure 2 is an enlarged side elevational view of the brace.

Figure 3 is an enlarged top plan view of the brace.

Figure 4 is an enlarged sectional view through the mud guard and brace, the arms of the brace being omitted.

Figure 5 is an enlarged interior plan view of the brace.

As shown on the drawings:

In referring to the drawings there is shown a front wheel 1 of a cycle that is equipped with a mud guard 2 which is braced horizontally with respect to the wheel by my novel brace.

This brace comprises a pair of slightly diverging metal arms 3 having attaching apertures 4 at the forward ends connected by a rear metal structure 5 which may be riveted to the arms or may be integral therewith. In the present instance the arms are shown as riveted to the rear structure. The rear structure is in the form of a U-shaped member designed to fit within the mud guard. The mud guard in the present instance is of angular formation. The rear structure of the brace is of corresponding angular formation.

The rear structure of the brace is provided with a pair of parallel slits 6 (Figure 5) which extend in parallel horizontal planes at the medial portion thereof. These slits are respectively made adjacent the upper and lower edges of the brace and the strips of metal between the slits and the said upper and lower edges of the brace are offset or stamped inwardly to provide a pair of parallel chord members 7 which provide a socket for a nut 8 adapted for receiving the attaching bolt or screw 9 for attaching the brace to the mud guard.

In the past, it has always been more or less difficult to attach the brace to the mud guard as it was exceedingly difficult to hold the nuts under the mud guard. It will accordingly be appreciated that by providing a suitable socket upon the interior of the mud guard in which the nut can be lodged against rotation, it will be a simple matter to screw the attaching bolt into the nut when standing at the rear of the mud guard without having to hold the nut against rotation. Further the chord members serve to rigidify and brace the rear structure of the mud guard.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A mud guard brace for a cycle comprising a pair of diverging arms connected by a rear structure having inwardly offset chord members in the same plane defining a nut socket.

2. A mud guard brace comprising a pair of arms, a U-shaped member connecting said arms, said member having slits adjacent its upper and lower edges, the metal between the edges and slits being inwardly offset to provide a pair of parallel chords for strengthening said structure and providing a nut socket.

In testimony whereof I have hereunto subscribed my name in the presence of two subscribing witnesses.

WALTER R. GREEN.

Witnesses:
CHARLES W. HILLS, Jr.,
CARLTON HILL.